Figure 1:
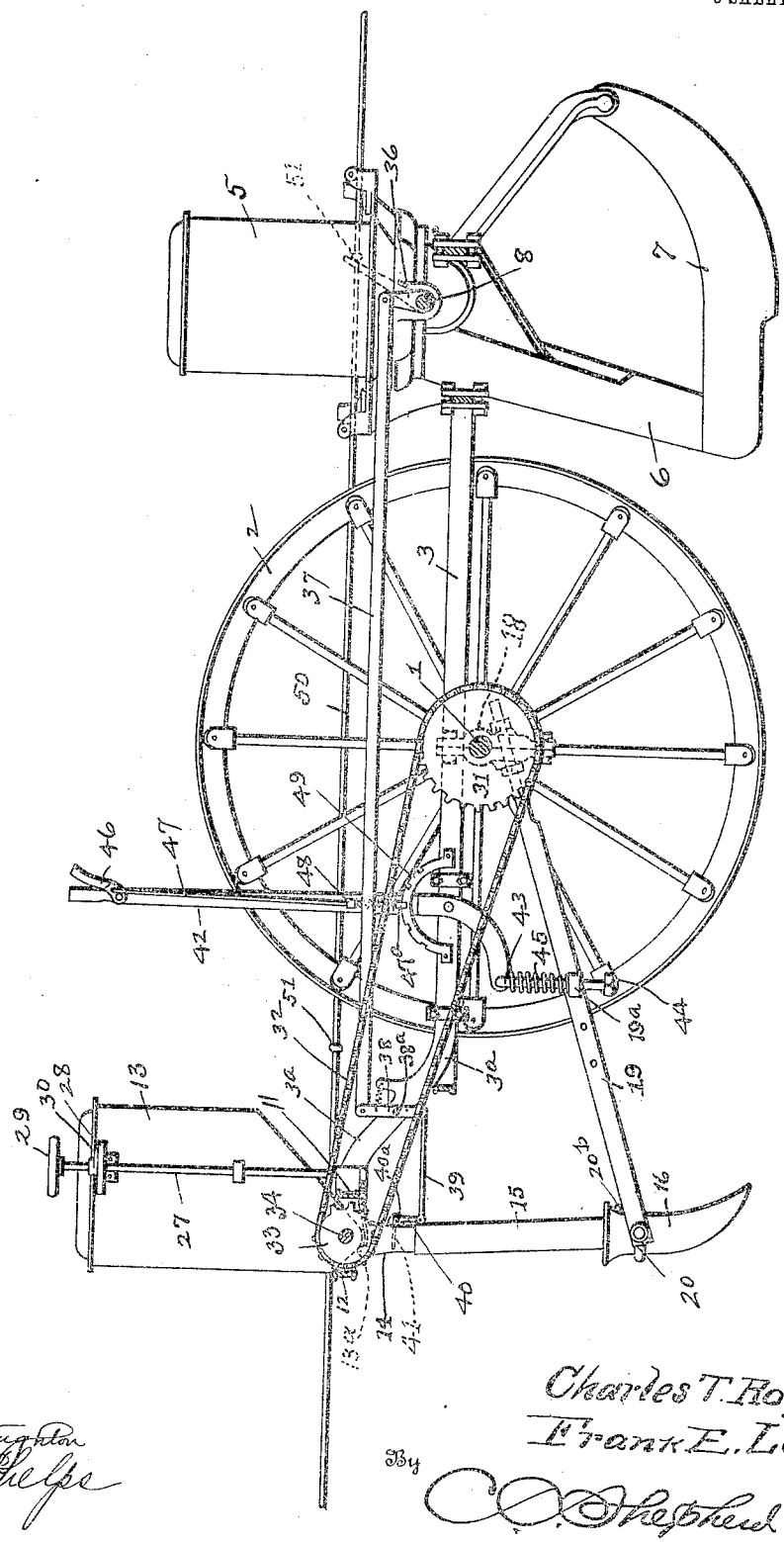

C. T. ROGERS & F. E. LEE.
FERTILIZER DISCHARGING ATTACHMENT FOR CORN PLANTERS.
APPLICATION FILED JULY 19, 1909.

958,772.

Patented May 24, 1910.
3 SHEETS—SHEET 1.

Witnesses
Carl Stoughton
A. L. Phelps

Inventors
Charles T. Rogers
Frank E. Lee
By
C. C. Shepherd Attorney

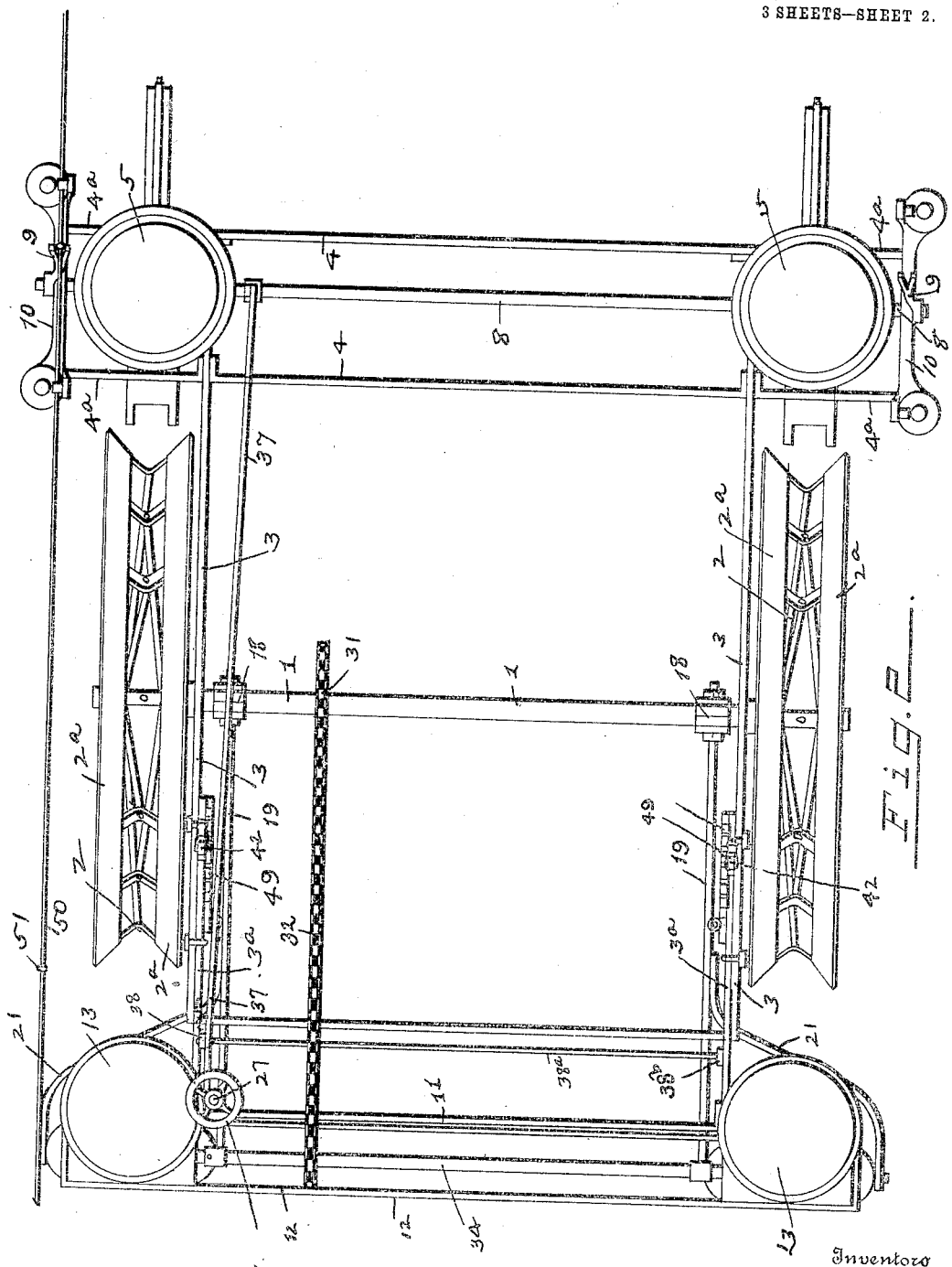

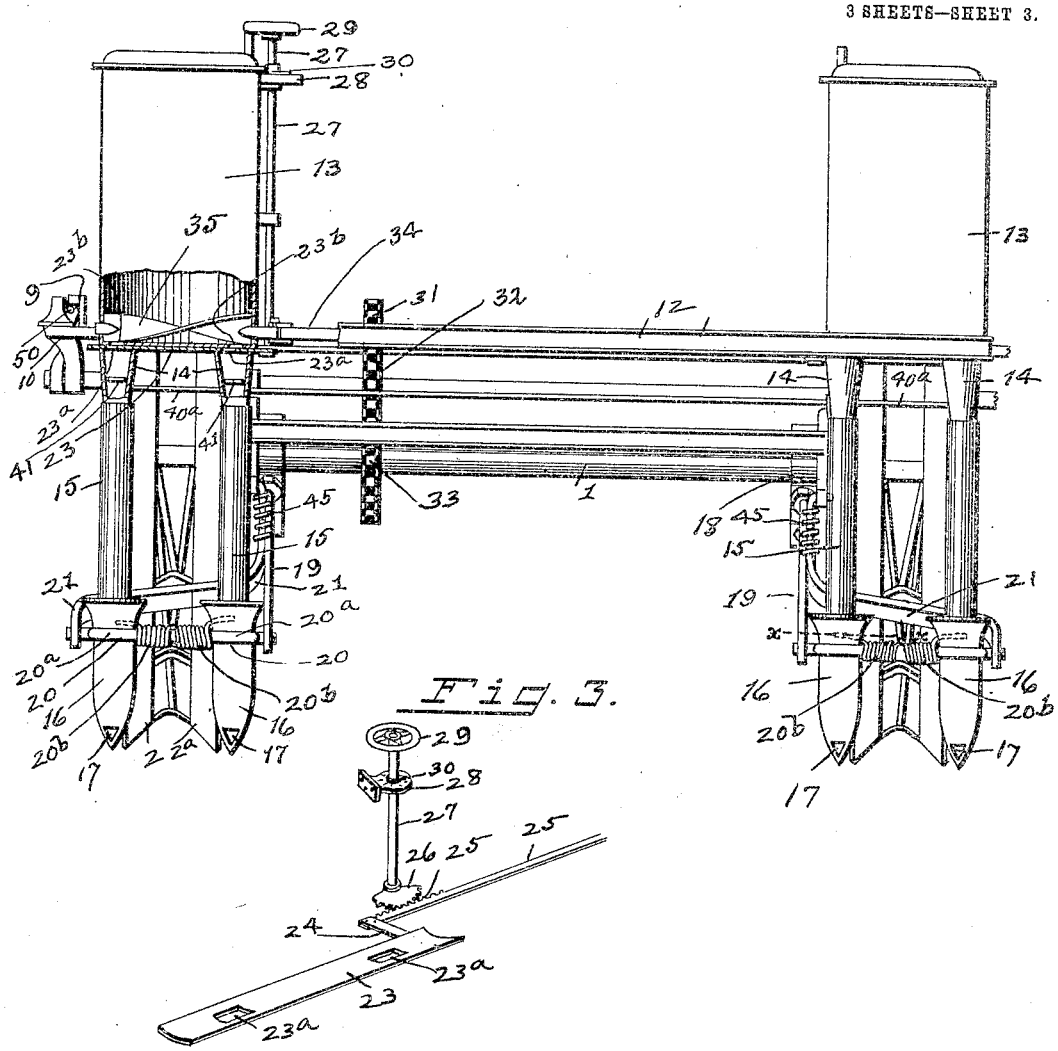

UNITED STATES PATENT OFFICE.

CHARLES TRUMAN ROGERS AND FRANK EDWARD LEE, OF CARDINGTON, OHIO.

FERTILIZER-DISCHARGING ATTACHMENT FOR CORN-PLANTERS.

958,772.　　　　　　　　Specification of Letters Patent.　　Patented May 24, 1910.

Application filed July 19, 1909. Serial No. 508,384.

*To all whom it may concern:*

Be it known that we, CHARLES T. ROGERS and FRANK E. LEE, citizens of the United States, residing at Cardington, in the county of Morrow and State of Ohio, have invented certain new and useful Improvements in Fertilizer - Discharging Attachments for Corn-Planters, of which the following is a specification.
Our invention relates to the improvement in fertilizer discharging attachments for corn planters, and the objects of our invention are to combine with a desirable form of check-row corn planter, an improved construction whereby a predetermined quantity of fertilizing material will be automatically discharged adjacent to each hill of corn planted by the corn planter; to provide in conjunction therewith means for regulating the amount of fertilizing material so discharged; to provide improved means for supporting the fertilizer discharging shoes whereby the same may yield when brought into contact with roots and similar obstacles and to produce other improvements the details of which will be more fully pointed out hereinafter.

These objects we accomplish in the manner illustrated in the accompanying drawings, in which:

Figure 1 is a central longitudinal section of a corn planter having our improved fertilizer distributing attachment connected therewith, Fig. 2 is a plan view, Fig. 3 is a rear end elevation of the machine, Fig. 4 is a detail view in perspective of one of the valve plates for regulating the amount of fertilizer discharged and showing in connection therewith, means for operating said valve plate, and, Fig. 5 is a transverse section on line $x$—$x$ of Fig. 3.

Similar numerals refer to similar parts throughout the several views.

In carrying out our invention, we employ a suitable or well known form of wheeled corn planter, of which 1 represents the transverse axle or ground wheel shaft and 2 represent the opposing ground wheels which are carried on the ends of said axles, said wheels having the usual dished or angular rims $2^a$. Supported upon the axle is the corn planter frame, of which 3 represent the parallel side frame members, which are connected by transverse frame bars 4 at their forward ends, the latter having extensions $4^a$ on the outer sides of the forward portions of the frame bars 3, for the support of the usual seed hoppers 5, each of these seed hoppers being provided with the usual downwardly extending outlet spout 6, with the lower end portions of which are connected the usual forwardly extending and upwardly curved furrow producing shoes 7.

8 represents the dropper operating shaft, which extends transversely between the lower portions of the hoppers 5 by the turning of which the seed corn is discharged from the hoppers in any usual or well known manner.

9 represents the forked check wire engaging arms which are carried on the outer ends of the shaft 8, the latter being journaled in bars 10 which connect the ends of the frame bar extensions $4^a$.

With the rear portion of each of the side frame bars 3, is rigidly connected a rearwardly and upwardly extending arm or frame bar extension $3^a$, these upwardly inclined extension arms being connected with a transverse frame bar 11. In rear of the frame bar 11 is a parallel frame bar 12 which extends beyond the outer sides of the frame members 3 and which in conjunction with extensions of the frame bar 11 form supports for fertilizer hoppers 13 which are thus arranged in rear of the ground wheels 2 and which are suitably connected with said frame extensions. Each of these hoppers 13 is formed with an inclined or beveled lower portion, which terminates in a rounded transverse portion or channel indicated in dotted lines at $13^a$ in Fig. 1. From each of the hoppers 13 lead downward vertical outlet spouts 14, which through the medium of flexible downwardly extending conduits 15, are connected with the upper ends of metallic discharging shoes 16, the latter tapering toward their lower ends and being forwardly curved, as shown, imparting thereto a substantially horn shape. In the underside of the forwardly turned portion of each of the shoes 16 is provided a discharge opening 17.

On the shaft 1 near the inner side of each of the frame bars 3 is secured a hanger 18 and with each of these hangers is connected the front end of a rearwardly and downwardly extending supporting bar 19, each of the latter being connected on the inner side of one of the inner shoes 16, with one end of a traverse keeper bar 20, one of which extends in rear of each pair of shoes 16, said keeper having on each side of its center, rounded U-shaped projections 20ª which partially embrace the rounded bodies of the shoes 16. The outer end of each of the keepers 20 is connected with one end of a bracket bar 21 which extends, as shown, from the corresponding supporting bar 19 with which it is connected. Upon the central portion of each of the keeper bars 20 and between the shoes 16, I provide two coiled springs 20ᵇ, one end of each of said springs being connected with said bar and the other ends thereof respectively engaging the forward sides of the upper portions of the shoes, the tension of said springs serving to normally hold said shoes against swinging through ordinary pressure. As indicated in Fig. 5 of the drawing, however, the upper portions of the shoes are preferably pivoted as indicated at 22 to the sides of the keeper projections 20ª.

Slidably extending through each pair of discharge spouts 14 immediately beneath the rounded or channel portion 13ª of each of the hoppers 13, is a valve plate or strip 23, in each of which is formed on opposite sides of the center of its length, openings 23ª which are adapted to register partially or wholly with openings 23ᵇ formed in the bottom of the hopper. The inner end of each of these valve plates 23 has rigidly connected therewith a laterally extending arm 24 and these arms 24 are connected by a horizontal bar 25 which toward one end is toothed as indicated at 25ª. Meshing with these teeth is a gear segment 26 which is carried on a vertically journaled shaft 27, the latter passing through an opening in a bracket 28 which is secured to and projects from the upper portion of one of the hoppers 13 and which upon its upper side about said shaft, is provided with a circular arrangement of scale marks. The upper end of the shaft is preferably provided with a suitable handle or hand wheel 29 to facilitate the rotation of said shaft and upon the shaft above the bracket plate 28 is carried an indicator hand 30. Upon the ground wheel shaft or axle 1 on one side of the center of the length thereof, is carried a sprocket wheel 31, over which runs an endless chain belt 32, the latter also running over a smaller sprocket wheel 33 carried upon a suitably journaled transverse shaft 34, the ends of said shaft projecting within the lower portions of the hoppers 13 and carrying in each of said hoppers a twisted and horizontally disposed agitating blade 35, the outer ends of said blade being journaled in the outer sides of the hoppers. Connected with the planter hopper operating shaft 8 is an upwardly extending arm 36 with which is pivotally connected the forward end of a rearwardly extending connecting bar 37 which in turn is pivotally connected with the upper end of a short bar 38, which is carried on a transverse rod 38ª which is journaled in the frame members 3. With the lower end of the bar 38 is connected a rearwardly extending rod 39 which at its rear end is pivotally connected with one arm of a bell crank valve 40, the remaining arm 41 of which projects through an opening in the forward side of one of the spouts 14 where it operates when in the horizontal position indicated in dotted lines in Fig. 1 to close said spout against the release of fertilizing material. This bell crank valve is carried upon a horizontal rod 40ª which is connected with a similar valve entering in a like manner the adjacent spout 14.

Upon the rod 38ª at the opposite side of the machine from that on which is mounted the bar 38, is carried a similar bar 38ᵇ (see Fig. 2), which bar in the manner prescribed for the bar 38, is connected with and adapted to operate valves corresponding with the valve 40 in connection with the spouts 14 on the corresponding side of the machine.

Pivoted to the inner side of each of the frame arms 3, is the lower portion of an upwardly extending lever 42, which below its pivot point, curves rearwardly, as shown, and is connected with the upper end of a downwardly extending rod 43 which passes through a lug 19ª on the adjacent bar 19. Below this lug the rod 43 terminates in a head or enlargement 44. Between the lug and the lower end of the lever 42, is interposed a coiled spring 45. To the upper portion of the lever 42, is pivoted a finger 46 with which is connected the upper end of a rod 47, the latter passing through a lug 48 on the lever 42 and having a bolt termination 47ª which is adapted to engage the desired one of a plurality of notches formed on the upper side of a rack segment 49 which rises from the corresponding frame member 3. A coiled spring is interposed between the lug 48 and the bolt terminations 47ª.

50 represents the check-row wire, which is ordinarily employed in connection with the class of corn planters shown and which has provided as usual thereon, buttons or enlargements 51 arranged at distances one from the other equal to distances between the proposed hills of corn. This check wire is adapted to run, as shown, through the bifurcation or fork termination of one of the shaft arms 9 in the usual manner.

In the operation of the class of corn planters herein shown, it is well known that the contact of the buttons or enlargements 51 of the check-row wire with the forked arm 9, results in swinging said forked arm until the latter is at such angle to permit the passing of the button therethrough and in a rocking or partial rotation of the shaft 8, which in the usual manner, operates the dropper, permitting the desired quantity of corn to pass downward through the chute 6 into the furrow previously cut by the shoe 7. The forward movement of the dish-shaped ground wheels, results in the usual manner in covering the corn thus deposited in the hill. In the forward movement of the machine, it is obvious that the fertilizer depositing shoes 16, will travel on opposite sides of the row of hills and that when the shaft 8 is partially rotated in the manner described, to effect the corn dropping operation, a rearward movement will be imparted to the bar 37, which through the operation of the bar 38 and its journaled supporting rod 38ª, will result in the forward movement of the rod 39 and the corresponding rod which is connected with the arm 38ᵇ, but which is not herein shown. In this manner the rod 40ª will be swung, resulting in the angular valve connected therewith being so turned as to drop the normally horizontal members 41 thereof downward within the spouts, permitting fertilizing material to be discharged through said spouts and their conductors 15 into the shoes 16 and thence outward through the openings 17 of said shoes. It is evident that the return of the shaft 8 to its normal position, will again close the fertilizer spout valves. In this manner, provision is made for the discharge of quantities of fertilizing material on opposite sides of the previously planted hills of corn, where such material will be absorbed by the earth about the corn hill, thus insuring a desired fertilizing of the soil at each hill. Through rotary motion imparted to the shaft 34 from the axle 1, it is obvious that rotary movement will be imparted to the mechanism or agitator blades 35 within the lower end portions of the hoppers 13, thus preventing the packing of the fertilizing material within the lower portions of the hoppers and insuring a free movement of said material into the outlet spouts.

The quantity of fertilizing material which is discharged through the shoes 16, may be regulated or governed by turning the shaft 27, thereby, through the connections described, imparting a horizontal movement to the valve connecting bar 25 through which movement the openings 23ª of the valve plates 23 may be brought into the desired relative arrangement with the openings 23ᵇ in the bottom of the hoppers 13. By the provision of scale marks on the bracket plate 28 and the indicating hand 30 on the shaft 27, it will be understood that means are provided for indicating the quantity of fertilizing material so discharged.

In order to raise the shoes 16 to a height which will prevent said shoes engaging an obstruction in the field or when the shoes are not desired for use, we have provided the levers 42 and their connections with the supporting bars 19. By moving these levers forward, it is obvious that the heads of the rods 43 may be brought into contact with the undersides of the lugs 19ª, resulting in a lifting of the supporting bars 19 and the shoes 16. It will be understood that in case the shoes 16 come into contact with unyielding roots, stones or similar obstacles, they may swing rearwardly in their pivotal connections with the supporting bars 19, thereby permitting them to pass over such obstruction, after which they will be returned to their normal positions by tension of the springs 20ᵇ.

Although we have shown and described two of the shoe elevating levers 42, it is obvious that but one of said levers might be employed to operate both the bars, these bars in order to facilitate such a change being suitably connected one with the other. It is also obvious that while hand operated levers are shown for raising the shoes, said shoe raising mechanism may be operated by a suitable foot lever.

From the construction and operation which we have described, it will readily be understood that a comparatively simple fertilizer discharging attachment is provided for check-row corn planters, by means of which each hill of corn will have deposited adjacent thereto, desirable quantities of fertilizing material, but while the elements shown and described are well adapted to serve the purposes for which they are intended, it is to be understood that this invention is not limited to the precise construction set forth, but includes within its purview such changes as may be made within the scope of the appended claims.

What we claim, is:

1. The combination with a check-row corn planter having corn dropper operating means, of fertilizer hoppers, and valve controlled discharging conduits adapted to discharge material from said hoppers on opposite sides of a previously planted and covered hill of corn, and connections between said dropper operating means and fertilizer conduit valves whereby the operation of the dropper opens said conduit valves.

2. The combination with a check-row corn planter having corn dropper operating means, of fertilizer hoppers supported by the frame of said corn planter, outlet spouts leading from said fertilizer hoppers, discharging shoes pivotally supported from the corn planter axle, keeper bars embracing the rear sides of said discharging shoes, springs on said keeper bars engaging the forward sides of said shoes, and flexible conduits between the outlet spouts of said fertilizer hoppers and said shoes, and means for discharging material from said fertilizer hoppers simultaneously with the discharge of grain from the corn planter hoppers.

3. The combination with a check-row corn planter having corn dropper operating means, of a fertilizer hopper having bottom openings, a valve plate slidable beneath said fertilizer hopper and having openings, a rack bar connected with said valve plate, a journaled operating shaft having means for moving said rack bar longitudinally, means carried by said shaft for indicating the amount of fertilizing material being discharged, valve controlled discharge conduits leading from said fertilizer hopper, and connections between said conduit valves and the corn dropper operating mechanism whereby said valves are opened at each operation of said dropper mechanism.

In testimony whereof we affix our signatures in presence of two witnesses.

CHARLES TRUMAN ROGERS.
FRANK EDWARD LEE.

Witnesses:
W. P. VAUGHAN,
D. MEZGEN.